United States Patent
Hart et al.

(10) Patent No.: US 10,992,476 B1
(45) Date of Patent: *Apr. 27, 2021

(54) VERIFYING ASSET IDENTITY

(71) Applicant: Rapid7, Inc., Boston, MA (US)

(72) Inventors: Jonathan Hart, Kernville, CA (US); Paul Deardorff, Westlake Village, CA (US)

(73) Assignee: Rapid7, Inc., Boston, MA (US)

( * ) Notice: Subject to any disclaimer, the term of this patent is extended or adjusted under 35 U.S.C. 154(b) by 92 days.

This patent is subject to a terminal disclaimer.

(21) Appl. No.: 16/511,294

(22) Filed: Jul. 15, 2019

Related U.S. Application Data (63) Continuation of application No. 15/601,988, filed on May 22, 2017, now Pat. No. 10,396,990.

(51) Int. Cl.
| | |
|---|---|
| *H04L 9/32* | (2006.01) |
| *H04L 29/06* | (2006.01) |
| *G06F 21/44* | (2013.01) |
| *G06F 21/10* | (2013.01) |
| *G06F 21/32* | (2013.01) |

(52) U.S. Cl.
CPC ............ *H04L 9/3231* (2013.01); *G06F 21/10* (2013.01); *G06F 21/32* (2013.01); *G06F 21/44* (2013.01); *H04L 63/0861* (2013.01); *H04L 63/0876* (2013.01); *H04L 63/126* (2013.01); *H04L 63/1433* (2013.01)

(58) Field of Classification Search
CPC ..... H04H 60/33; G06F 3/0488; G06F 15/173; G06F 21/00; G06F 21/10; G06F 21/32; G06F 21/44; H04L 9/00; H04L 9/32; H04L 9/3231; H04L 63/0861; H04L 63/0876; H04L 63/126; H04L 63/1433
See application file for complete search history.

(56) References Cited

U.S. PATENT DOCUMENTS

| | | | |
|---|---|---|---|
| 6,963,975 B1 | 11/2005 | Weare | |
| 7,546,288 B2 * | 6/2009 | Springer, Jr. | ......... G06F 16/313 |
| 8,984,626 B2 | 3/2015 | Barton | |
| 9,491,517 B2 | 11/2016 | Trollope | |
| 9,697,229 B2 * | 7/2017 | Masinter | ............. G06F 16/1873 |
| 2008/0270787 A1 | 10/2008 | LaCous | |
| 2010/0043066 A1 | 2/2010 | Miliefsky | |
| 2014/0115007 A1 * | 4/2014 | Harvey | .................. H04L 41/50 |
| | | | 707/796 |
| 2015/0254555 A1 * | 9/2015 | Williams, Jr. | ....... G06N 3/0454 |
| | | | 706/14 |

OTHER PUBLICATIONS

Handbook of Fingerprint Recognition, Springer-Verlag London Limited 2009, Second Edition (Year: 2009).

* cited by examiner

*Primary Examiner* — Thanhnga B Truong
(74) *Attorney, Agent, or Firm* — Danielson Legal LLC (57) ABSTRACT

Methods and systems for verifying asset identity. The system includes a rules engine executing a corpus of rules to analyze received fingerprint data regarding one or more assets in a network. The rules engine may execute the rules to create a synthetic fingerprint to provide more accurate and helpful information regarding a network asset.

18 Claims, 4 Drawing Sheets

```
{
  "fingerprints":[
    {
     "type": "os",
     "vendor": "Microsoft",
     "product": Windows 2003 Server",
     "version": "SP2"
    }
  ]
}
```
⎯ 300

FIG. 3

```
{
  "fingerprints":[
    {
     "type": "os",
     "accuracy": "95";
     "vendor": "Microsoft",
     "product": Windows 2003 Server",
     "version": "SP2"
    }
  ]
}
```
⎯ 400

FIG. 4

```
{
  "fingerprints":[
    {
     "type": "os",
     "vendor": "Microsoft",
     "product": Windows 2003 Server",
     "version": "SP2"
    },
    {
     "type": "os",
     "vendor": "Microsoft",
     "product": "Windows 2003 Server",
     "version": "SP2"
    }
  ]
}
```
⎯ 500

FIG. 5

```
{
  "fingerprints":[
    {
      "type": "os",
      "accuracy": "95";
      "vendor": "Microsoft",
      "product": Windows 2003 Server",
      "version": "SP2"
      "version.accuracy": "50"
    }
  ]
}
```

VERIFYING ASSET IDENTITY

The present application claims the benefit of pending U.S. utility patent application Ser. No. 15/601,988, filed on May 22, 2017, and issued as U.S. Pat. No. 10,396,990, on Aug. 27, 2019, the entire disclosure of which is incorporated by reference as if set forth in its entirety herein.

TECHNICAL FIELD

This invention generally relates to systems and methods for verifying asset identity and, more particularly but not exclusively, to systems and methods for verifying asset identity using fingerprint data.

BACKGROUND

In the field of information security, "fingerprinting" may refer to the act of obtaining data or information identifying a network asset or entity. Fingerprint data may identify the asset or entity itself or it may identify various secondary characteristics of the asset or entity such as product name, version information, CPU architecture, vendor name, etc.

Information security personnel or other types of operators may gather fingerprint data for a variety of reasons. From an asset or inventory management perspective, having a complete and detailed understanding of all assets in or in communication with a network may be necessary for effective IT governance.

As another example, accurate fingerprint data may play a pivotal role in vulnerability assessment, penetration testing, and other security-related tasks. Specifically, inaccurate fingerprint data and reliance thereon may result in false-positive and/or false-negative scenarios that can be harmful to a network's security.

There are several existing techniques that aim to reduce false-positives and false-negatives when fingerprinting network assets. One existing technique is to use only the most recently gathered fingerprint of an asset for analysis. Another existing technique is to use all available fingerprints. However, these techniques assume that each collected fingerprint is accurate and complete. Decisions that are made on incomplete or inaccurate fingerprints can yield detrimental results.

In other words, these existing techniques suffer from the "garbage in, garbage out" problem. That is, the resultant fingerprint data used to identify an asset is only as good as the source fingerprint data.

A need exists, therefore, for methods and systems that overcome these disadvantages of existing techniques.

SUMMARY

This summary is provided to introduce a selection of concepts in a simplified form that are further described below in the Detailed Description section. This summary is not intended to identify or exclude key features or essential features of the claimed subject matter, nor is it intended to be used as an aid in determining the scope of the claimed subject matter.

In one aspect, embodiments relate to a method for verifying asset identity. The method includes receiving, via an interface, at least two fingerprints regarding an asset, wherein each of the at least two fingerprints comprises a confidence score; and creating, via a rules engine executing at least one rule for combining at least two fingerprints, a synthetic fingerprint for the asset using the at least two fingerprints.

In one embodiment, each of the at least two fingerprints include at least one of product name, version, and vendor name.

In one embodiment, the asset is selected from the group consisting of an operating system, a service, a browser, a piece of software, or a hardware device.

In one embodiment, the method further includes assigning a default confidence score to at least one fingerprint if the at least one fingerprint does not have a previously assigned confidence score.

In one embodiment, receiving the at least two fingerprints includes receiving the at least two fingerprints through an HTTP service.

In one embodiment, each of the at least two fingerprints are communicated to the interface in JavaScript Object Notation or XML format.

In one embodiment, the method further includes generating an asset security list for network security analysis comprising a list of at least one asset in a network, each asset being associated with at least one synthetic fingerprint. In one embodiment, the method further includes generating a security map identifying at least one vulnerability for at least one asset from the asset security list for network security analysis.

In one embodiment, the method further includes generating an inventory summary for inventory management comprising a list of at least one asset in a network, each asset being associated with at least one synthetic fingerprint.

In one embodiment, the method further includes receiving, via a user interface, input from an operator related to at least one of the fingerprints, and wherein the rules engine utilizes the operator input when creating the synthetic fingerprint.

According to another aspect, embodiments relate to a system for verifying asset identity. The system includes an interface configured to receive at least two fingerprints regarding an asset, wherein each of the at least two fingerprints comprises a confidence score; a memory storing at least one rule for combining at least two fingerprints; and a rules engine configured to execute the at least one rule stored on the memory to create a synthetic fingerprint for the asset using the at least two fingerprints.

In one embodiment, the system further comprises a user interface configured to receive input from an operator that is related to at least one of the fingerprints, wherein the rules engine utilizes the operator input when creating the synthetic fingerprint.

In one embodiment, each of the at least two fingerprints include at least one of product name, version, and vendor name.

In one embodiment, the asset is selected from the group consisting of an operating system, a service, a browser, a piece of software, and a hardware device.

In one embodiment, at least one of the fingerprints is assigned a default confidence score if the at least one fingerprint does not have a previously assigned confidence score.

In one embodiment, the at least two fingerprints are received by the interface through an HTTP service.

In one embodiment, each of the at least two fingerprints are communicated to the interface in JavaScript Object Notation or XML format.

In one embodiment, the rules engine is further configured to generate an asset security list for network security analysis comprising a list of at least one asset in a network, each asset being associated with at least one synthetic fingerprint.

In one embodiment, the rules engine is further configured to generate an inventory summary for inventory management comprising a list of at least one asset in a network, each asset being associated with at least one synthetic fingerprint.

In one embodiment, at least one of the fingerprints comprises a plurality of types of metadata that are customizable by a user.

According to yet another aspect, embodiments relate to a method for verifying asset identity. The method includes receiving, via an interface, at least two fingerprints regarding an asset, wherein each of the at least two fingerprints comprises a confidence score; receiving, via a user interface, input from an operator that is related to at least one of the fingerprints; creating, via a rules engine executing at least one rule for combining at least two fingerprints, a synthetic fingerprint for the asset using the at least two fingerprints and the operator input; and generating, via the rules engine, a list of at least one asset in a network, with each asset being associated with at least one synthetic fingerprint.

BRIEF DESCRIPTION OF DRAWINGS

Non-limiting and non-exhaustive embodiments of the invention are described with reference to the following figures, wherein like reference numerals refer to like parts throughout the various views unless otherwise specified.

DETAILED DESCRIPTION

Various embodiments are described more fully below with reference to the accompanying drawings, which form a part hereof, and which show specific exemplary embodiments. However, the concepts of the present disclosure may be implemented in many different forms and should not be construed as limited to the embodiments set forth herein; rather, these embodiments are provided as part of a thorough and complete disclosure, to fully convey the scope of the concepts, techniques and implementations of the present disclosure to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Reference in the specification to "one embodiment" or to "an embodiment" means that a particular feature, structure, or characteristic described in connection with the embodiments is included in at least one example implementation or technique in accordance with the present disclosure. The appearances of the phrase "in one embodiment" in various places in the specification are not necessarily all referring to the same embodiment.

Some portions of the description that follow are presented in terms of symbolic representations of operations on non-transient signals stored within a computer memory. These descriptions and representations are used by those skilled in the data processing arts to most effectively convey the substance of their work to others skilled in the art. Such operations typically require physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices. Portions of the present disclosure include processes and instructions that may be embodied in software, firmware or hardware, and when embodied in software, may be downloaded to reside on and be operated from different platforms used by a variety of operating systems.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each may be coupled to a computer system bus. Furthermore, the computers referred to in the specification may include a single processor or may be architectures employing multiple processor designs for increased computing capability.

The processes and displays presented herein are not inherently related to any particular computer or other apparatus. Various general-purpose systems may also be used with programs in accordance with the teachings herein, or it may prove convenient to construct more specialized apparatus to perform one or more method steps. The structure for a variety of these systems is discussed in the description below. In addition, any particular programming language that is sufficient for achieving the techniques and implementations of the present disclosure may be used. A variety of programming languages may be used to implement the present disclosure as discussed herein.

In addition, the language used in the specification has been principally selected for readability and instructional purposes and may not have been selected to delineate or circumscribe the disclosed subject matter. Accordingly, the present disclosure is intended to be illustrative, and not limiting, of the scope of the concepts discussed herein.

Features of the present invention improve the quality of fingerprints by reducing false-positive and false-negatives. Specifically, the methods and systems described herein implement a rules-based system to analyze previously gathered fingerprint data to form a more complete, accurate, and actionable synthetic fingerprint.

In the context of the present application the term "fingerprint" may refer to a collection of metadata about a particular network asset such as a hardware device, operating system, interface controller, browser, or other type of entity (hereinafter "asset"). These particular assets may be defined by or otherwise have one or more common attributes (e.g., vendor, product, name, version, etc.) and a related fingerprint may include one or more of these attributes. However, these fingerprints and their attributes are flexible enough to support various forms of customization. For example, the system may consider other contextual information when creating synthetic fingerprints, such as business details, location, ownership, communication paths or behaviors, sensitivity, priority ranking, or the like. By considering this additional data, the created synthetic fingerprint will be more accurate and/or precise and therefore more useful.

The features of the present invention may prove useful as the Internet of things (IoT) becomes more prevalent. More particularly, in the context of the present application the terms "Internet of Things" and "IoT" may be understood to encompass a network or system with a device that, in sufficient quantity, would qualify a device as "IoT" device.

For example, if a device on a network has an exposed UPnP service, communicates with HTTP services, and can communicate over Bluetooth® technology, the device would likely be considered an IoT device in the context of the present application. However, each of these device traits individually may not be sufficient to classify the device as an IoT device. For example, the UPnP service may be just be a generic Microsoft® service, the HTTP services may end anonymously in various web services, or the Bluetooth hardware may be specific to a particular vendor.

Figure 1:
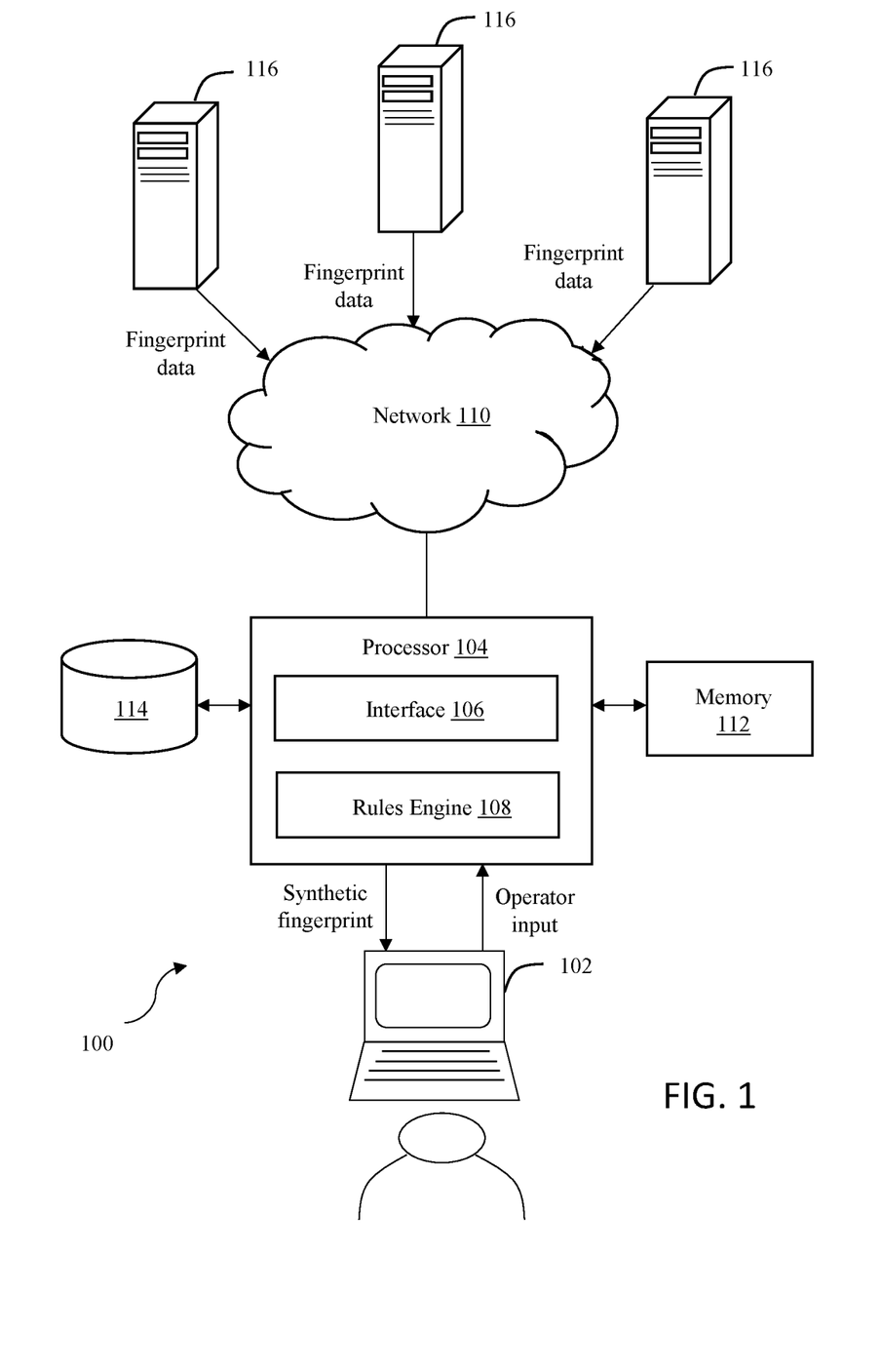
FIG. 1 depicts a system for verifying asset identity in accordance with one embodiment.

FIG. 1 illustrates a system 100 for verifying asset identity in accordance with one embodiment. The system 100 may include a user interface 102 accessible by an operator such as security personnel or the like and a processor 104 that includes an interface 106 and a rules engine 108. The system 100 may include or otherwise be implemented in connection with one or more networks 110, and further include memory 112 and one or more databases 114.

The user interface 102 may be any type of interface accessible by an operator such as security personnel, a network administrator, or the like (hereinafter "operator"). The user interface 102 may enable the operator to submit queries and view data regarding fingerprints, executed rules, generated synthetic fingerprints, or the like. The user interface 102 may also enable an operator to define rules and provide additional input regarding fingerprints. The user interface 102 may be a web application or other suitable interface and may be presented by, for example, a PC, laptop, tablet, mobile device, or the like.

The processor 104 may be any hardware device capable of executing the rules engine 108 to analyze fingerprint data and create synthetic fingerprints based on the received fingerprint data. The processor 104 may be a microprocessor, a field programmable gate array (FPGA), an application-specific integrated circuit (ASIC), or other similar devices. In some embodiments, such as those relying on one or more ASICs, the functionality described as being provided in part via software may instead be configured into the design of the ASICs and, as such, the associated software may be omitted. The processor 104 may be configured as part of the user interface 102 (e.g., a laptop) or may be located at some remote location.

The processor interface 106 may enable the processor 104 to receive source fingerprints for one or more network assets 116. The processor interface 106 may then communicate the received source fingerprint data to the rules engine 108.

The rules engine 108 may execute one or more rules stored on memory 112 to analyze the received fingerprint data. The rules engine 108 may execute applicable rules to transform less complete, less accurate fingerprint data into more complete and more precise synthetic fingerprints. The knowledge expressed in the rules executed by the rules engine 108 represent decisions or actions generally taken by operators who are experts in the domain of fingerprinting. The rules may be manually specified by an operator or another third party, or may be determined through the use of one or more automated processes, such as deep learning algorithms executed on various data sets as known to one of ordinary skill.

The network or networks 110 may link the various devices with various types of network connections. The network(s) 110 may be comprised of, or may interface to, any one or more of the Internet, an intranet, a Personal Area Network (PAN), a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1, or E3 line, a Digital Data Service (DDS) connection, a Digital Subscriber Line (DSL) connection, an Ethernet connection, an Integrated Services Digital Network (ISDN) line, a dial-up port such as a V.90, a V.34, or a V.34bis analog modem connection, a cable modem, an Asynchronous Transfer Mode (ATM) connection, a Fiber Distributed Data Interface (FDDI) connection, a Copper Distributed Data Interface (CDDI) connection, or an optical/DWDM network.

The network(s) 110 may also comprise, include, or interface to any one or more of a Wireless Application Protocol (WAP) link, a Wi-Fi link, a microwave link, a General Packet Radio Service (GPRS) link, a Global System for Mobile Communication G(SM) link, a Code Division Multiple Access (CDMA) link, or a Time Division Multiple access (TDMA) link such as a cellular phone channel, a Global Positioning System (GPS) link, a cellular digital packet data (CDPD) link, a Research in Motion, Limited (RIM) duplex paging type device, a Bluetooth radio link, or an IEEE 802.11-based link.

The memory 112 may be L1, L2, L3 cache or RAM memory configurations. The memory 112 may include non-volatile memory such as flash memory, EPROM, EEPROM, ROM, and PROM, or volatile memory such as static or dynamic RAM, as discussed above. The exact configuration/type of memory 112 may of course vary as long as instructions for verifying asset identity and creating synthetic fingerprints can be executed by the processor 104.

The database 114 may store a variety of types of data related to network entities, fingerprints, and previously created synthetic fingerprints. Data collected such as fingerprint data may be uploaded to one or more storage services at predetermined time intervals (e.g., once every hour). This data may also be sent through a processing pipeline to add additional metadata to the fingerprint data.

The network 110 may enable communication with a plurality of network assets 116 for which fingerprint data is desired. These assets may include, but are not limited to, operating systems, services, browsers, pieces of software, hardware devices, or the like.

Figure 2:
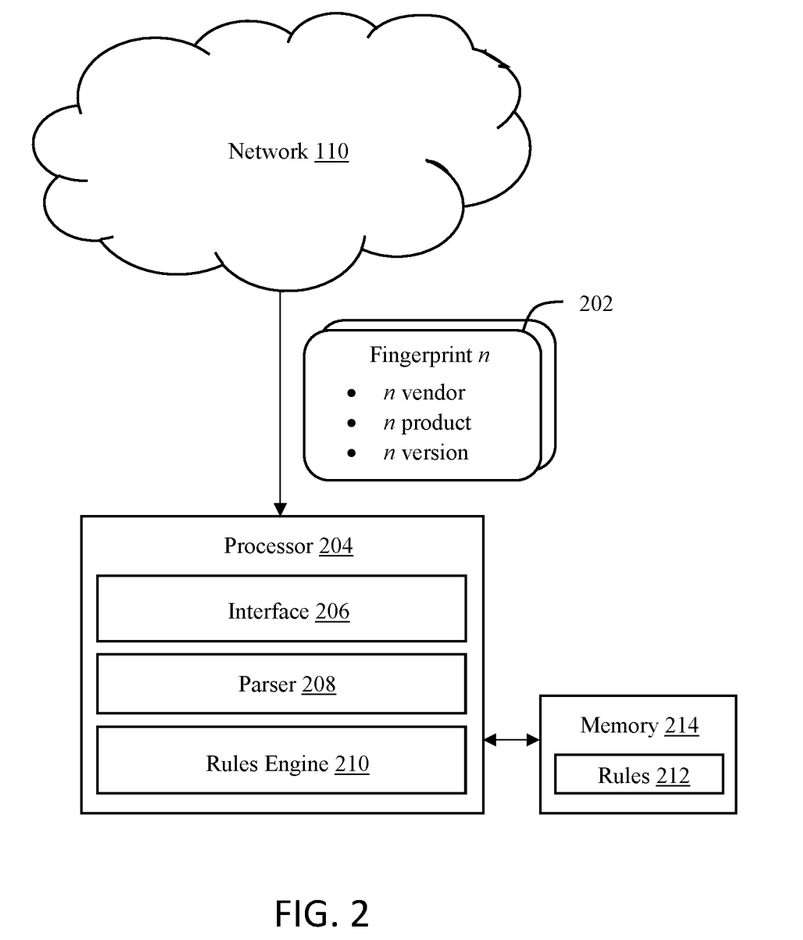
FIG. 2 illustrates the processor of FIG. 1 receiving fingerprint data in accordance with one embodiment.

As shown in FIG. 2, data regarding one or more fingerprints 202 may be communicated to the processor 204. The processor 204 shown in FIG. 2 may be similar to the processor 104 of FIG. 1 and include a processor interface 206, parser 208, and a rules engine 210 executing a corpus of rules 212 stored on memory 214.

In operation, fingerprints 202 regarding an asset may be gathered by some external device or system that may actively query the asset or passively monitor one or more actions by the asset and thereby construct the fingerprint(s) 202. For example, an external system may execute a remote login request against an asset and parse the returned data for cues as to the asset's operating system, model, manufacturer, etc. In another instance, an external system may intercept HTTP communications from an asset and, based on various items of metadata in the communications, determine that the asset is running FIREFOX® web browser version 32 on a WINDOWS® computer with various plugins allowing for digital rights management of content.

The processor 204 does not require that existing fingerprinting products change how they perform fingerprinting to gather these fingerprints. However, the processor 204 does require that the obtained fingerprint data is communicated to the processor 204 in a way that allows it to be interpreted and processed.

For example, source fingerprint data 202 may be provided to the processor 204 using semi-structured JSON data or XML data through an HTTP service. Additionally or alternatively, the system 100 may support the consumption of fingerprint stored locally in memory or a database. This may be useful in the event where communicating with a remote service is not possible or feasible.

Upon receipt of source fingerprint data, the parser software 208 may first, in one embodiment, parse each fingerprint to convert the fingerprint data from JSON to a representation used by the rules engine 210 if the rules engine 210 does not directly support the JSON format. For example, the processor 204 may locate a JSON document on a storage medium, parse it, and evaluate fingerprint data using the rules engine 210 and the fingerprint-combining/merging rules 212 stored on memory 214 to produce enhanced fingerprint data.

The supplied data 202 may include one or more fingerprints in JSON format to be used as source fingerprints. Each source fingerprint may include a collection of one or more attributes or components that together form the fingerprint representing the asset or the entity. In other words, these attributes may denote or otherwise connote what type of asset or entity is being fingerprinted. Attributes may include, for example but without limitation, data regarding the asset's operating system, service(s), pieces of software, type of physical device, or the like.

In some embodiments, such as the embodiment shown in FIG. 2, the supplied data 202 regarding a source fingerprint n may relate to the vendor, product, and version of a particular asset. In the context of the present application, the term "vendor" may refer to the name of a company, organization, group, or person that produced, wrote, built, owns, or otherwise is associated with the asset being fingerprinted.

In the context of the present application, the term "product" may refer to the asset being fingerprinted. In the context of the present application, the term "version" may refer to the version of the asset being fingerprinted. A source fingerprint must include at least one of these attributes.

In the event that one of these attributes of a source fingerprint is unknown or otherwise not applicable, it may simply be omitted. However, the minimum composition of a source fingerprint is one attribute. Additionally, the attributes are typically vendor or user-defined and extensible, therefore allowing custom fingerprint data to be considered and for custom rules to be implemented.

Source fingerprints may also be associated with or include a value that indicates the confidence, completeness, or accuracy of the provided fingerprint. Acceptable values may be scored on a scale of, e.g., from 1 to 100, with a higher value indicating higher confidence. Confidence scores may be represented in any other appropriate method as well. If no confidence score is provided with the fingerprint, the rules engine 210 may assign it a default confidence score.

In some embodiments in which no confidence score is provided with the fingerprint, the rules engine 210 may execute one or more rules to assign an overall higher confidence score. Additionally or alternatively, the rules engine 210 may consider other attributes or factors into account that result in a better score.

As mentioned previously, the processor 204 includes a rules engine 210 that executes a corpus of rules 212 for analyzing source fingerprint data and processing it into a synthetic fingerprint. In one embodiment these rules 212 as "if-then" rules that represent knowledge possessed by experts in the domain of fingerprinting. These rules enable the rules engine 210 to: combine data from two or more fingerprints to create a synthetic fingerprint; compute a better or more accurate synthetic fingerprint in the presence of conflicts in the source fingerprints; and determine a more accurate, precise and actionable fingerprint.

Regarding the first capability, the rules engine 210 may produce more accurate and more complete fingerprints by combining data from two or more source fingerprints. For example, in one embodiment the rules engine 210 may be tasked with fingerprinting an operating system. In this type of scenario, the rules engine 108 may receive a source fingerprint with one or more attributes implying that the operating system is "Windows 7" and another source fingerprint with one or more attributes implying the architecture is 64-bit. In response, the rules engine 210 may execute one or more rules 212 that could assert the asset is therefore a "64-bit Windows 7" operating system.

Regarding the second capability, the rules engine 210 may provide a means for determining what the best, most accurate, and complete fingerprint is in the presence of conflicts. The rules 212 may first perform any required sorting and merging related duties. For example, in this scenario, the rules engine 210 may receive a source fingerprint that includes an attribute that implies the asset is an "Ubuntu 16.04" server and a source fingerprint that includes an attribute that implies the asset is an "Ubuntu 14.04" server. In this scenario, the rules engine 210 may address the conflict by analyzing the confidence scores associated with the respective source fingerprints and presuming that information present in a fingerprint with a higher confidence score should prevail over conflicting information present in a fingerprint with a lower confidence score.

Similarly, the rules engine 210 may receive two very different source fingerprints, e.g., that both relate to operating systems. For example, the rules engine 210 may recognize that a source fingerprint implying an operating system is "Ubuntu 16.04 Server 64-bit" and a second source fingerprint implying an operating system is "Windows XP 32-bit" are too dissimilar to compare and that the most accurate source fingerprint based on their confidence scores should be used. In scenarios in which two or more source fingerprints are different, a user may be prompted to manually enter data regarding the fingerprints.

Regarding the third capability, the rules engine 210 may generate a more accurate, precise, and actionable fingerprint based on two or more source fingerprints. For example, in one scenario the rules engine 210 may receive an nginx 0.9.4 service fingerprint from an HTTP service on port 8080, an operating system fingerprint of Linux 2.6.39 obtained from an IP stack fingerprint, and a fingerprint of an Ethernet device attached to a given device manufactured by a certain organization (e.g., Cisco). Based on this obtained data, the rules engine 210 may determine this is a Cisco NX 9000 series switch running NX OS, version 6.2.10, and create a synthetic fingerprint containing this information.

Sometimes fingerprint data or knowledge expressed by the rules 212 may be unable to yield a sufficiently accurate fingerprint. A user interface such as the user interface 102 of FIG. 1 may therefore allow an operator to assist the system by answering questions or otherwise providing additional input about the asset or assets being fingerprinted. This additional input may fill in gaps of the knowledge of the asset in question to allow the rules engine 210 to generate more accurate synthetic fingerprints and therefore provide meaningful output to an operator.

For example, in one embodiment, the rules engine 210 may receive two arbitrary OS fingerprints that lack data about the CPU architecture and version, but are otherwise equal in other attribute values (e.g., vendor and product). In this case, a user interface may prompt the operator for more data about the CPU architecture or version. The user interface may allow an operator to, for example, specify an effective lower-bound for what the operator thinks the version of the operating system is (e.g., "Service pack 1"). Accordingly, this assists the rules engine 210 in creating synthetic fingerprints.

In yet another embodiment, a database of relevant information, an expert system, or a trained classifier that may perform the role of the operator, may supply expert knowledge to resolve conflicts or fill in gaps encountered when creating synthetic fingerprints from existing fingerprint data.

Figure 3:
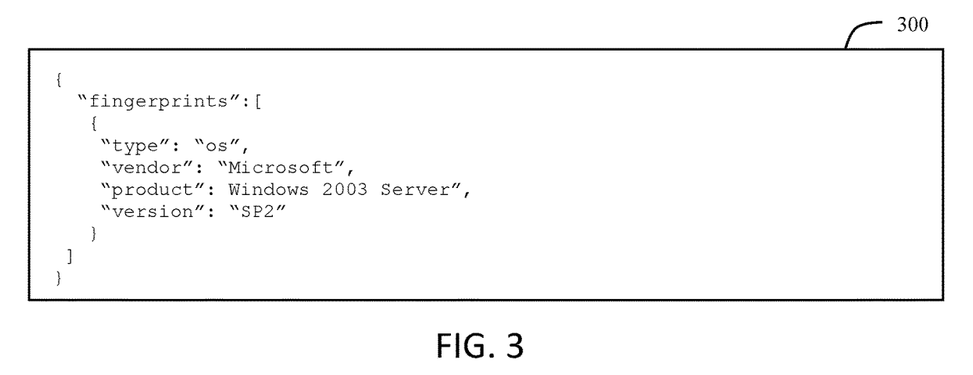
FIG. 3 depicts an exemplary fingerprint in accordance with one embodiment.

FIG. 3 depicts an exemplary source fingerprint 300 in accordance with one embodiment. This fingerprint 300 may be presented to an operator via a user interface such as the user interface 102 of FIG. 1. As seen in FIG. 3, the fingerprint 300 may include the attributes type, vendor, product, and version. Also shown in FIG. 3 are the respective values for these attributes: "OS" (indicating this is a fingerprint for an operating system), "Microsoft," Windows 2003 Server", and "SP2."

Figure 4:
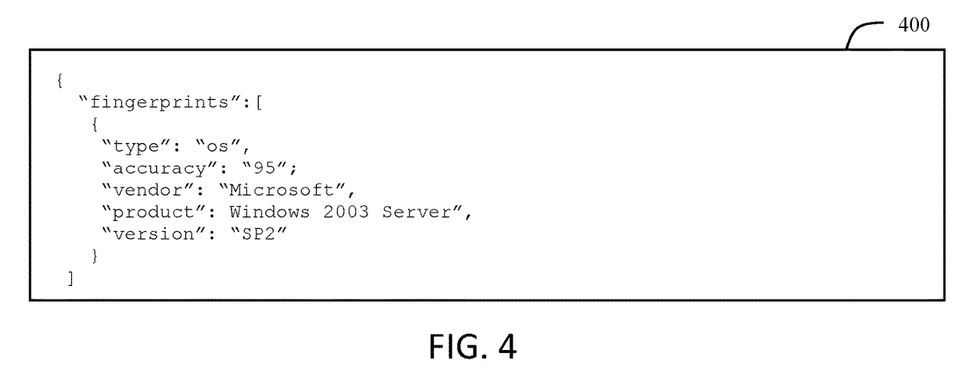
FIG. 4 depicts an exemplary fingerprint in accordance with another embodiment.

As mentioned previously, a source fingerprint may be associated with or assigned a confidence score based on the information provided. If only one source fingerprint is received and has values for all attributes, then the source fingerprint may have a high confidence score. For example, FIG. 4 depicts a fingerprint 400 that includes the information of the fingerprint 300 of FIG. 3. The fingerprint 400 also includes an accuracy attribute with a value of "95." Accordingly, this accuracy/confidence score indicates a 95% confidence in this particular source fingerprint. This high confidence may reflect the fact that there are values for all attributes and that there are no identified conflicts with other source fingerprints. A source fingerprint may also be assigned a "completeness" score that represents how much information is present. For example, a fingerprint may have only a vendor attribute (with a 100% confidence value), but it could be only 25% complete because it is missing other components.

Figure 5:
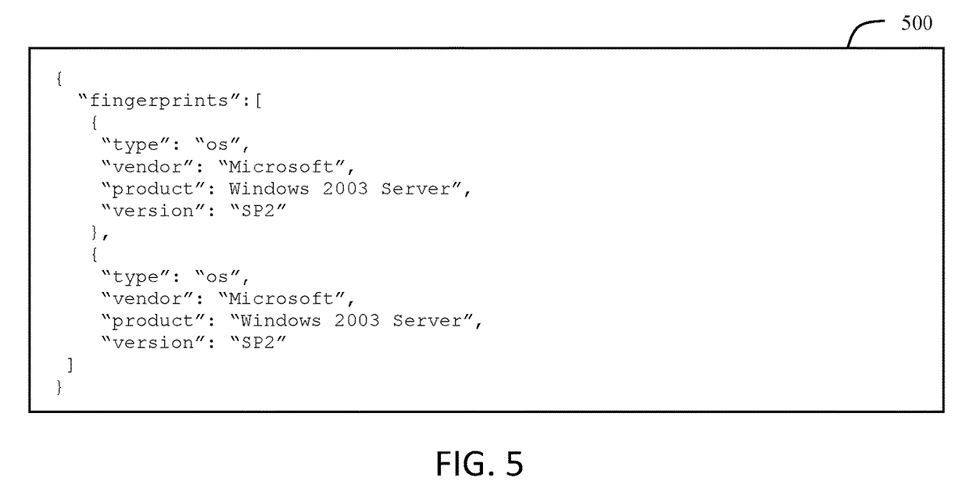
FIG. 5 depicts two exemplary fingerprints in accordance with one embodiment.

FIG. 5 shows that additional source fingerprints can simply be added as an entry of a list 500. That is, the list 500 of FIG. 5 includes two source fingerprints. These source fingerprints are very similar with the exception that the first fingerprint indicates the version of a particular asset is "SP1" and the second fingerprint indicates the version is "SP2." This type of conflict may cause a fingerprint to have a lower confidence value or a particular attribute of a fingerprint to have a lower confidence value.

Figure 6:
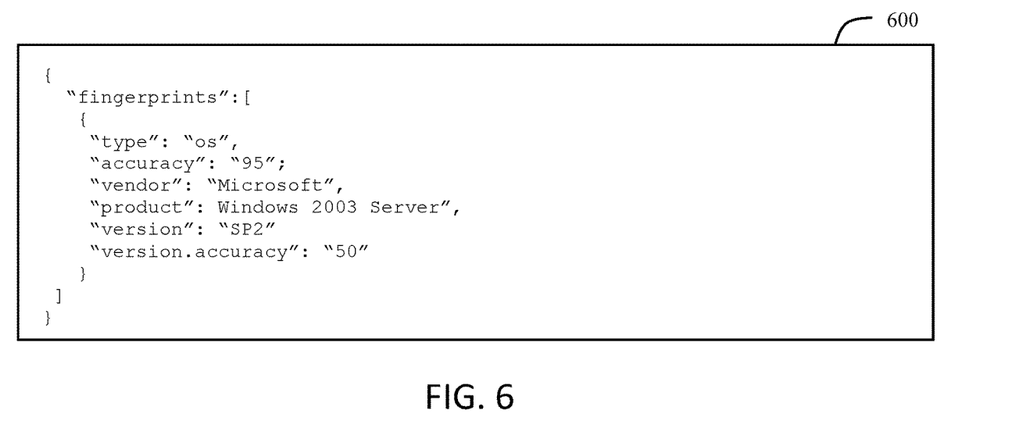
FIG. 6 depicts an exemplary fingerprint in accordance with another embodiment.

For example, FIG. 6 depicts an exemplary fingerprint 600 that specifies the accuracy of the asset's version. As shown, the version.accuracy value is 50 indicating that there is less confidence in the version attribute. The source fingerprint 600 of FIG. 6 may correspond to one of the conflicting source fingerprints of FIG. 5. As mentioned above the two source fingerprints of FIG. 5 have conflicting values of the version attribute. Accordingly, this conflict may be the reason why the version.accuracy value is so low.

Once the source fingerprint data is received, the rules engine 210 may execute one or more of various rules 212 to generate one or more synthetic fingerprints. The created synthetic fingerprint(s) may be presented to an operator via a user interface or an equivalent as discussed above. The created synthetic fingerprints may be in a form that is similar to the source fingerprints of FIGS. 3-6. The size and composition of the created list of synthetic fingerprints may of course vary and may depend on the received source fingerprints as well as the knowledge contained by the rules 212 used to generate the synthetic fingerprints.

In some scenarios, the source fingerprints may already be sufficiently accurate or complete. In these scenarios, the rules engine 210 may simply return an empty list or return the most accurate source fingerprint as the synthetic fingerprint. In embodiments in which multiple complete, accurate, or synthetic fingerprints are involved, the rules engine 210 may return a list of fingerprints along with an accuracy or confidence attribute for each fingerprint that may be used by the rules engine 210 or an operator or the equivalent to pick the "best" fingerprint.

Figure 7:
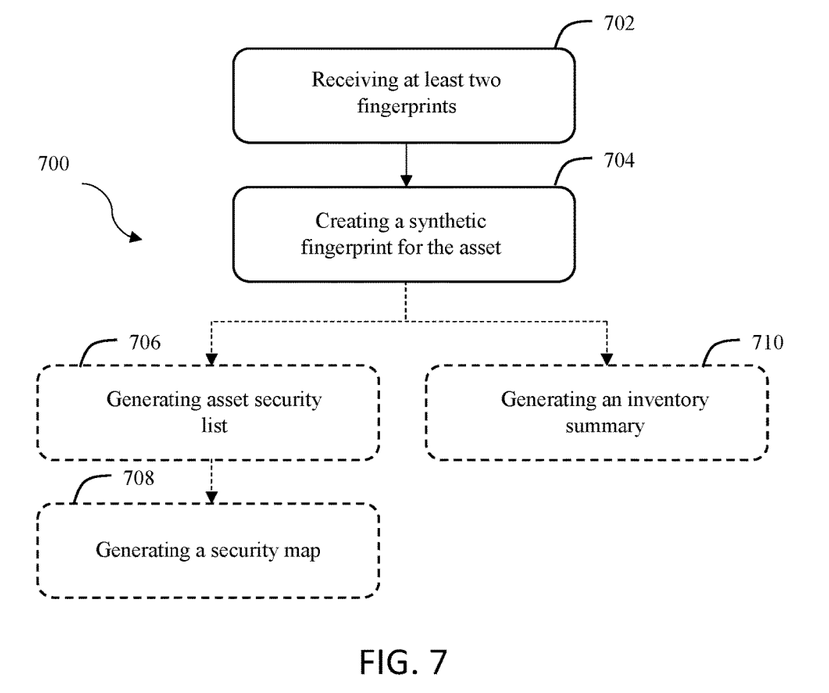
FIG. 7 depicts a flowchart of a method for verifying asset identity in accordance with one embodiment.

FIG. 7 depicts a flowchart of a method 700 of verifying asset identity in accordance with one embodiment. Step 702 involves receiving at least two fingerprints. These fingerprints may be source fingerprints related to a particular asset or entity on or off of a network. Each of the received fingerprints may include a confidence score. These fingerprints may be gathered by any suitable fingerprinting technique or methodology known in the art and may be communicated to (i.e., received by) an interface on a processor such as the processor 204 of FIG. 2.

Step 704 involves creating a synthetic fingerprint for the asset using the at least two fingerprints. The synthetic fingerprint may be created by a rules engine in communication with the interface that executes at least one rule for combining the fingerprints. The created synthetic fingerprint may subsequently be used in various applications that utilize the identity of one or more assets on a network.

For example, method 700 may include the optional step 706 of generating an asset security list for network security applications. This list may include a list of at least one asset in a network, wherein each asset in the network is associated with at least one synthetic fingerprint. This helps operators or other interested parties monitor assets in a network which may be useful for IT governance reasons or penetration testing services. The generated security list may identify one or more assets based on a host name, IP address, or some other unique identifier for each asset.

This list may further be used to, in optional step 708, generate a security map that identifies at least one vulnerability for at least one asset from the asset security list. This generated map may provide a graphical illustration to enable an operator to easily view assets in a network as well as any potential vulnerabilities. The generated security map may identify one or more assets based on a host name, IP address, or some other unique identifier for each asset.

To identify vulnerabilities, the synthetic fingerprint information may be compared to a database of known vulnerabilities. For example, knowledge regarding known vulnerabilities may be obtained from the Common Enumeration Platform made available by The MITRE Corporation. Accordingly, the name, IP address, or other unique identifier identifies the asset, the fingerprints describe the asset, and the fingerprints can be used to identify any vulnerabilities.

In various embodiments, method 700 may involve optional step 710 which involves generating an inventory summary. This inventory summary may be used for inventory management and thereby provide an operator with a summary of all assets in a network.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Embodiments of the present disclosure, for example, are described above with reference to block diagrams and/or operational illustrations of methods, systems, and computer program products according to embodiments of the present disclosure. The functions/acts noted in the blocks may occur out of the order as shown in any flowchart. For example, two blocks shown in succession may in fact be executed substantially concurrent or the blocks may sometimes be executed in the reverse order, depending upon the functionality/acts involved. Additionally, or alternatively, not all of the blocks shown in any flowchart need to be performed and/or executed. For example, if a given flowchart has five blocks containing functions/acts, it may be the case that only three of the five blocks are performed and/or executed. In this example, any of the three of the five blocks may be performed and/or executed.

A statement that a value exceeds (or is more than) a first threshold value is equivalent to a statement that the value meets or exceeds a second threshold value that is slightly greater than the first threshold value, e.g., the second threshold value being one value higher than the first threshold value in the resolution of a relevant system. A statement that a value is less than (or is within) a first threshold value is equivalent to a statement that the value is less than or equal to a second threshold value that is slightly lower than the first threshold value, e.g., the second threshold value being one value lower than the first threshold value in the resolution of the relevant system.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of various implementations or techniques of the present disclosure. Also, a number of steps may be undertaken before, during, or after the above elements are considered.

Having been provided with the description and illustration of the present application, one skilled in the art may envision variations, modifications, and alternate embodiments falling within the general inventive concept discussed in this application that do not depart from the scope of the following claims.

What is claimed is:

1. A method for verifying asset identity, the method comprising:
   receiving, via an interface, a fingerprint regarding an asset on a network;
   detecting, using a processor executing instructions stored on a memory and providing a deep learning algorithm, that the fingerprint is at least partially incomplete;
   prompting a user for feedback regarding the asset using a user interface;
   receiving feedback from the user regarding the asset; and
   creating a synthetic fingerprint regarding the asset using the deep learning algorithm and the feedback received from the user.

2. The method of claim 1, wherein the fingerprint includes at least one of product name, version, and vendor name.

3. The method of claim 1, wherein the asset is selected from the group consisting of an operating system, a service, a browser, a piece of software, or a hardware device.

4. The method of claim 1, further comprising assigning a default confidence score to the fingerprint if the fingerprint does not have a previously assigned confidence score.

5. The method of claim 1, wherein receiving the fingerprint includes receiving the fingerprint through an HTTP service.

6. The method of claim 1, wherein the fingerprint is communicated to the interface in JavaScript Object Notation or XML format.

7. The method of claim 1, further comprising generating an asset security list to help operators monitor assets on the network for IT governance reasons or penetration testing services, the asset security list comprising at least one asset on the network, each asset being associated with at least one synthetic fingerprint.

8. The method of claim 7, further comprising generating a security map identifying at least one vulnerability for an asset from the asset security list for network security analysis.

9. The method of claim 1, further comprising generating an inventory summary for inventory management comprising a list of at least one asset on the network, each asset being associated with at least one synthetic fingerprint.

10. A system for verifying asset identity, the system comprising:
an interface configured to receive a fingerprint regarding an asset on a network;
a memory; and
a processor executing instructions stored on a memory and providing a deep learning algorithm, the processor configured to:
detect that the fingerprint is at least partially incomplete;
prompt a user for feedback using a user interface regarding the asset using a user interface;
receive feedback from the user regarding the asset;
create a synthetic fingerprint regarding the asset using the deep learning algorithm and the feedback received from the user.

11. The system of claim 10, wherein the fingerprint includes at least one of product name, version, and vendor name.

12. The system of claim 10, wherein the asset is selected from the group consisting of an operating system, a service, a browser, a piece of software, and a hardware device.

13. The system of claim 10, wherein the fingerprint is assigned a default confidence score if the at least one fingerprint does not have a previously assigned confidence score.

14. The system of claim 10, wherein the fingerprint is received by the interface through an HTTP service.

15. The system of claim 10, wherein the fingerprint is communicated to the interface in JavaScript Object Notation or XML format.

16. The system of claim 10, wherein the processor is further configured to generate an asset security list to help operators monitor assets on the network for IT governance reasons or penetration testing services, the asset security list comprising at least one asset on the network, each asset being associated with at least one synthetic fingerprint.

17. The system of claim 10, wherein the processor is further configured to generate an inventory summary for inventory management comprising a list of at least one asset on the network, each asset being associated with at least one synthetic fingerprint.

18. The system of claim 10, wherein the fingerprint comprises a plurality of types of metadata that are customizable by a user.

* * * * *